(No Model.)  2 Sheets—Sheet 1.
T. A. EDISON & C. L. CLARKE.
REGULATOR FOR SYSTEMS OF ELECTRICAL DISTRIBUTION.
No. 287,525. Patented Oct. 30, 1883.
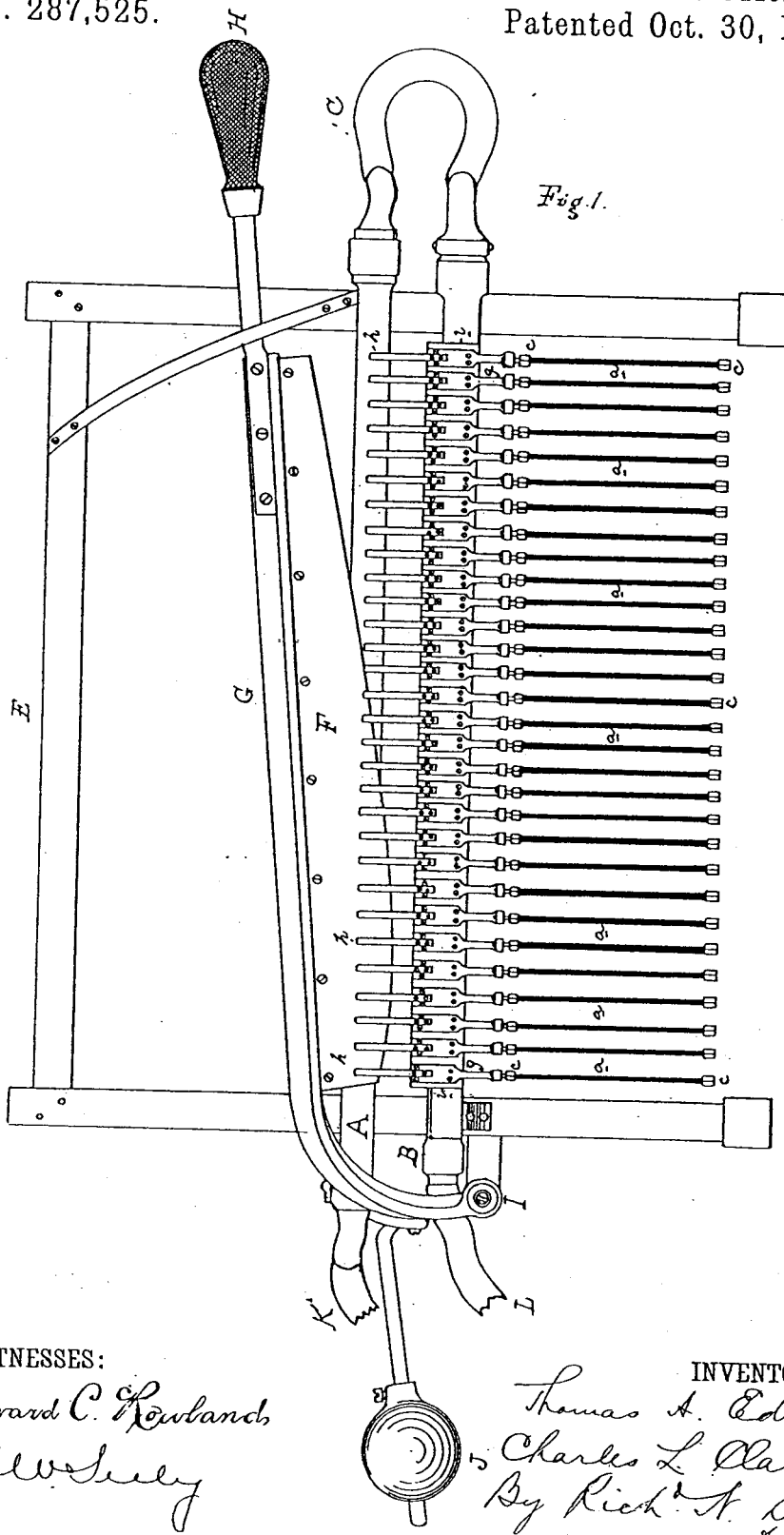
WITNESSES:
INVENTORS:

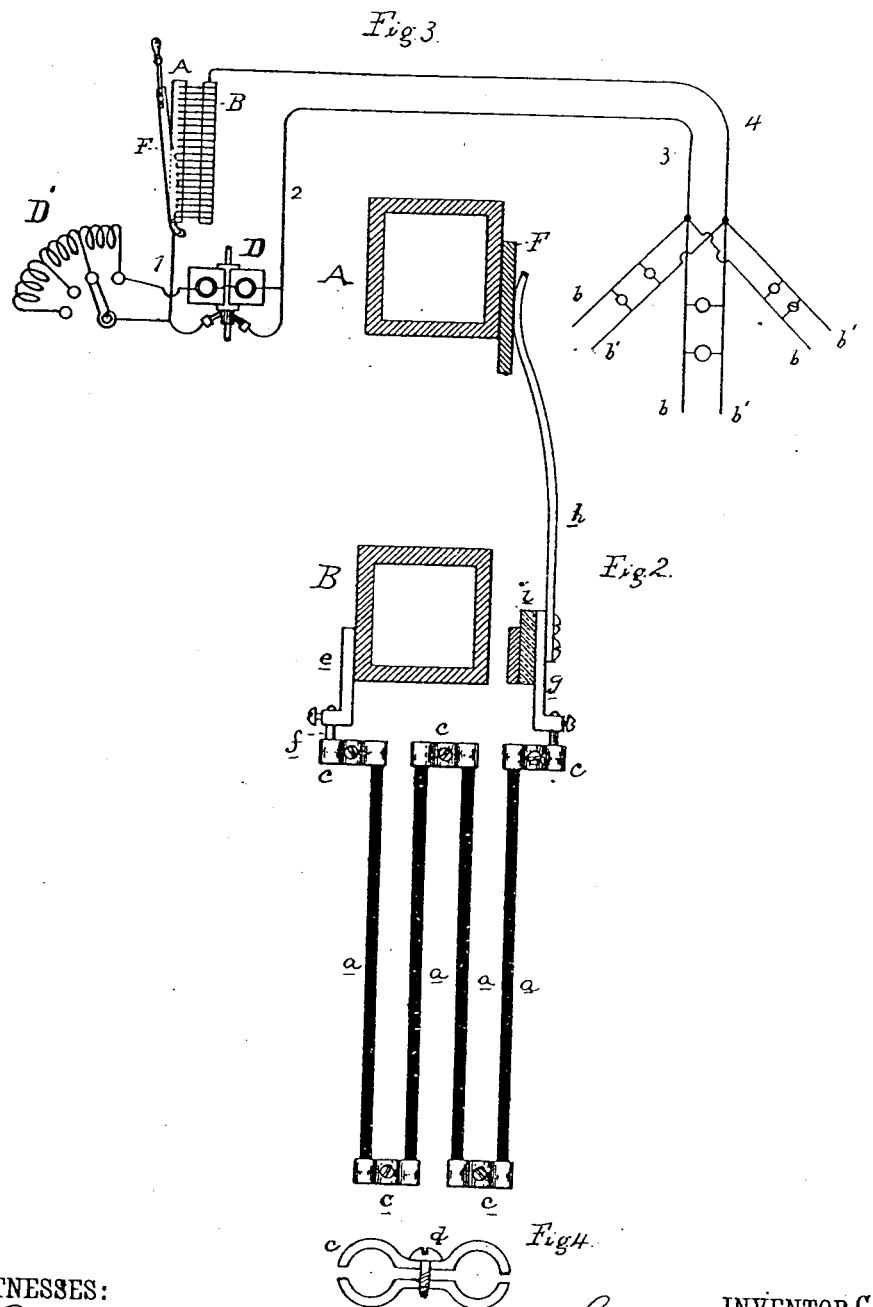

UNITED STATES PATENT OFFICE.

THOMAS A. EDISON, OF MENLO PARK, NEW JERSEY, AND CHARLES L. CLARKE, OF NEW YORK, N. Y., ASSIGNORS TO THE EDISON ELECTRIC LIGHT COMPANY, OF NEW YORK, N. Y.

REGULATOR FOR SYSTEMS OF ELECTRICAL DISTRIBUTION.

SPECIFICATION forming part of Letters Patent No. 287,525, dated October 30, 1883.

Application filed October 20, 1882. (No model.) Patented in England October 14, 1882, No. 4,884, and in France October 31, 1882, No. 151,841.

*To all whom it may concern:*

Be it known that we, THOMAS A. EDISON, of Menlo Park, in the county of Middlesex and State of New Jersey, and CHARLES L. CLARKE, of the city, county, and State of New York, have invented a certain new and useful Improvement in Regulators for Systems of Electrical Distribution, of which the following is a specification.

Our invention relates to a regulating apparatus used in connection with a system of electrical distribution in which the current is distributed from a central point to various parts of a district where lamps, motors, and other translating devices are arranged in multiple arc. In such a system the generators at the central station are connected with feeding-circuits on which no lamps are placed, but which are connected at suitable points with the street-mains on multiple-arc circuits from which the lamps are placed. In such a system it is necessary to preserve a constant electro-motive force or "pressure" in the circuits where the translating devices are placed. The electro-motive force at the end of a feeding-circuit is indicated by a suitable device placed at the central station and connected by an auxiliary circuit with the end of the feeding-circuit, and it is regulated in accordance with such indications by varying the resistance of the feeding-circuit, all of which is fully set forth in the application of the said Edison filed December 9, 1881, (Serial No. 47,468.) According to our invention, this variation is accomplished by causing each feeding-circuit to be broken at a convenient point, and providing a number of paths for the current across such break, each of considerable resistance, means being provided for throwing into circuit more or less of such paths, as desired. Such paths or resistances, it will be understood, are in multiple-arc relation to each other, and consequently the more we place in circuit the less the resistance of the feeder and the greater the amount of current supplied to the lamps.

It is usually customary to vary the resistance of a circuit by throwing more or less resistance in series, so to speak, directly into such circuit. We, however, prefer the mode just described, for here as fast as we decrease the resistance, and thereby increase the current in the circuit, we correspondingly increase the current-carrying capacity of this portion of the circuits per unit of length, while in the old way, when the current is increased, the conductivity of the circuit remains the same, and there may be danger of exceeding the capacity of the conductors. The preferable form of apparatus for this purpose we have found to be as follows: The wire or cable from one pole of the generator or generators is connected to one of two metal pipes, preferably of copper, which are placed, preferably, one above the other, or in any convenient position. The conductor from the other pole is connected directly to the feeding-circuit, while the return-conductor of such circuit is connected with the second pipe. It is understood that each feeding-circuit of the district is provided with the apparatus described. To the lower pipe are attached, at short distances apart and along its entire length in any suitable manner, the ends of the carbon rods, the other end of each of which is connected with the lower end of a spring whose upper end approaches nearly to but does not touch the upper pipe. Preferably a number of these carbon rods are placed in series between the lower pipe and each spring. Pivoted at one end to the frame which supports the pipes is a "knife," consisting of a suitable back and a handle of insulating material, with a copper plate or blade, such blade being preferably broad at its outer end and narrow near the handle. Such knife is so placed that the blade can be forced down between the upper pipe and the springs and make electrical connection between them, more or less of the springs being in contact with the pipe, according as the blade is pressed down or drawn up.

It is evident that as more springs are connected with the pipe more of the carbon rods will be placed in multiple arc between the pipes, and consequently the greater will be the conductivity of the feeding-circuit of which such pipes form a part. Therefore, when more translating devices are placed in the consumption-circuit in the vicinity of the point of connection between the feeder and such circuit, the blade is pushed down and more of the rods thrown into circuit, and when such devices are removed from circuit the blade is raised. At one end the pipes are connected by a rubber or other tube, and one pipe is connected at its other end to a source of water-supply, so that a circulation of water is kept up and the pipes are kept cool. A weight is attached to the knife as a counter-balance to hold it in the position in which it is placed; or a spring or suitable friction devices may be used for this purpose. Each dynamo or magneto electric machine of the battery of such machines supplying the feeding-circuits is regulated for the total number of translating devices in circuit in any suitable way, preferably by throwing resistance into and out of its field-circuit, while the adjustable resistances in the feeder-circuits are used to regulate for the unequal distribution throughout the system (the variations in location of translating devices) without reference to the total number of translating devices in circuit.

Instead of the form of variable resistance above described, the calorimeter-barrels shown in the application of Edison above referred to may be used, the knife above described being employed to place a greater or less number of the wire coils in circuit.

Our invention may be better understood by reference to the annexed drawings, in which—

Figure 1 is a front elevation of the regulating apparatus; Fig. 2, a transverse vertical section of the same; Fig. 3, a diagram illustrating the circuit-connections, and Fig. 4 a top view of the clamp which holds the carbon rods.

A and B are the two pipes, filled with water and connected together by rubber tube C.

Referring to Fig. 3, a main conductor, 1, from the generator or generators represented at D is connected to the pipe A, while main conductor 2 is connected to the conductor 3 of the feeding-circuit 3 4. Such feeding-circuit runs to a point where the circuits $b\ b'$, which supply the translating devices of the system, are connected to it in multiple arc. The conductor 4 of the feeding-circuit is connected to the pipe B. D' is the adjustable resistance in the field-circuit of the generator D.

Referring to Figs. 1 and 2, E is a suitable frame, which supports the pipes A and B. $a\ a$ are carbon rods having their ends held in clamps $c$, such clamps being preferably of the form shown in Fig. 4—viz., being made in two parts, each part consisting of two curves joined together by a straight piece, and a screw, $d$, being passed through the straight portion of both, so that a double clamp is formed for holding two carbons. Metal pieces $e$ are attached at one end to the side of pipe B, and to the other end of each a piece, $f$, is attached, which enters the clamp $c$, whose other half holds a carbon rod. Four of these rods are shown in Fig. 2 as connected in series, the end of the last carbon being attached to the piece $g$, to which is fastened the spring $h$, which approaches nearly but does not touch the pipe A. All the pieces $g$ are secured to the strip $i$, which is of wood or other insulating material. F is a copper blade, of the form shown in Fig. 1, attached to a suitable back, G, and having a handle, H. The knife thus formed is pivoted at I. Such knife, it will be seen, can be forced down between the springs $h$ and the tube A to any desired distance and again withdrawn, thus connecting the pipes through more or less of the carbon rods $a\ a$, and increasing or diminishing the conductivity of the feeding-circuit 3 4. The conductors are fastened to the pipes in any suitable manner. J is a counterbalance-weight used to hold the knife in the position in which it is placed. By means of rubber tube K water is introduced into pipe A, which flows off through tube L.

It is to be understood that all patentable features of invention shown or described but not claimed herein are reserved for protection in other patents, and have been or will be embodied in other applications for patents.

What we claim is—

1. The combination, with an opened electrical circuit, of a series of resistances connected in multiple arc with the circuit on one side of the break, separate spring-terminals to such resistances, a conductor connected with the circuit on the other side of the break and crossing said spring-terminals in close proximity thereto, and an intermediate circuit-controlling device making a sliding or rubbing contact between said conductor and more or less of the resistance-terminals, substantially as set forth.

2. The combination, with the parallel conductors, of the carbon resistances attached to one conductor, the springs attached to such resistances, and the copper blade for electrically connecting more or less of such springs with the other conductor, substantially as set forth.

3. The combination, with an electrical circuit, of a resistance, an adjusting device for throwing the resistance into and out of circuit, and a water-pipe for conducting off the heat, the circuits of the resistance being made and broken upon such water-pipe, substantially as set forth.

4. The combination, with an electrical circuit, of a series of exposed carbon rods serving as resistances, means for throwing such rods into and out of circuit, and a water-pipe for conducting off the heat, the circuits of the carbon rods being made and broken upon such water-pipe, substantially as set forth.

5. The combination, with an opened electrical circuit, of metallic water-pipes forming the terminals of the circuit, resistances in multiple arc between such water-pipes, and means for throwing the resistances into and out of circuit, substantially as set forth.

This specification signed and witnessed this 4th day of October, 1882.

THOS. A. EDISON.
CHAS. L. CLARKE.

Witnesses:
H. W. SEELY,
E. H. PYATT.